United States Patent
Lim et al.

(10) Patent No.: US 9,876,808 B2
(45) Date of Patent: Jan. 23, 2018

(54) METHOD FOR DETECTING INTRUSION IN NETWORK

(71) Applicant: GWANGJU INSTITUTE OF SCIENCE AND TECHNOLOGY, Gwangju (KR)

(72) Inventors: Hyuk Lim, Gwangju (KR); Jong-Won Kim, Gwangju (KR); Jargalsaikhan Narantuya, Gwangju (KR); Tae-Jin Ha, Gwangju (KR); Chi-Wook Jeong, Gwangju (KR)

(73) Assignee: GWANGJU INSTITUTE OF SCIENCE AND TECHNOLOGY, Gwangju (KR)

( * ) Notice: Subject to any disclaimer, the term of this patent is extended or adjusted under 35 U.S.C. 154(b) by 50 days.

(21) Appl. No.: 14/861,665

(22) Filed: Sep. 22, 2015

(65) Prior Publication Data
US 2016/0182541 A1 Jun. 23, 2016

(30) Foreign Application Priority Data
Dec. 18, 2014 (KR) .................. 10-2014-0183589

(51) Int. Cl.
*H04L 29/06* (2006.01)
*H04L 12/26* (2006.01)

(52) U.S. Cl.
CPC ........ *H04L 63/1416* (2013.01); *H04L 43/026* (2013.01)

(58) Field of Classification Search
CPC .............. H04L 63/1416; H04L 43/026; H04L 43/0894; H04L 43/022; H04L 43/024; H04L 63/1408
See application file for complete search history.

(56) References Cited

U.S. PATENT DOCUMENTS

| | | | | |
|---|---|---|---|---|
| 7,295,516 B1 * | 11/2007 | Ye | ............ | H04L 47/10 370/232 |
| 7,808,897 B1 * | 10/2010 | Mehta | ................. | H04L 12/2602 370/230 |

(Continued)

OTHER PUBLICATIONS

K. Giotis, C. Argyropoulos, G. Androulidakis, D. Kalogeras, V. Maglaris: "Combining OpenFlow and sFlow for an effective and scalable anomaly detection and mitigation mechanism on SDN environments". Computer Netwoks 62, p. 122-136, 2014, Elsevier.*

(Continued)

*Primary Examiner* — Catherine Thiaw
(74) *Attorney, Agent, or Firm* — Hauptman Ham, LLP

(57) ABSTRACT

A method for detecting an intrusion in a network is disclosed. The network includes a plurality of nodes for data transmission/reception and switches for relaying flow transmission/reception between the nodes, and an intrusion detection system (IDS) is combined with the network to form a system The method includes: installing SDN-enabled switches for flow sampling in the network to connect them to SDN controllers; determining, by the SDN controller, the number of network flows and the number of switches; deriving a sampling rate for each of the SDN-enabled switches; forwarding, by the switches, packet information sampled at respective sampling rates to the IDS; and identifying, by the IDS, malicious data based on the packet information to update the sampling rate of each of the SDN switches.

6 Claims, 4 Drawing Sheets

(56) References Cited

U.S. PATENT DOCUMENTS

| | | | | |
|---|---|---|---|---|
| 9,246,828 | B1* | 1/2016 | Tagore | H04L 47/25 |
| 9,363,151 | B2* | 6/2016 | Brown | H04L 43/024 |
| 2005/0210533 | A1* | 9/2005 | Copeland | H04L 63/1416 |
| | | | | 726/23 |
| 2007/0153689 | A1* | 7/2007 | Strub | H04L 63/1441 |
| | | | | 370/230 |
| 2007/0171824 | A1* | 7/2007 | Ruello | H04L 43/16 |
| | | | | 370/232 |
| 2008/0028467 | A1* | 1/2008 | Kommareddy | H04L 63/1458 |
| | | | | 726/23 |
| 2013/0311675 | A1* | 11/2013 | Kancherla | H04L 43/026 |
| | | | | 709/244 |
| 2014/0325649 | A1* | 10/2014 | Zhang | H04L 43/024 |
| | | | | 726/23 |
| 2015/0089045 | A1* | 3/2015 | Agarwal | H04L 43/04 |
| | | | | 709/224 |
| 2016/0065476 | A1* | 3/2016 | Reddy | H04L 43/0888 |
| | | | | 709/224 |
| 2016/0134503 | A1* | 5/2016 | Watson | H04L 63/1416 |
| | | | | 709/224 |
| 2016/0254959 | A1* | 9/2016 | Arndt | H04L 41/0816 |
| 2016/0353461 | A1* | 12/2016 | Vachuska | H04L 12/6418 |

OTHER PUBLICATIONS

[Supportive Materials for Exception to Loss of Novelty] 2014 IEEE 3rd International Conference on Cloud Networking on Oct. 8, 2014.

* cited by examiner

FIG. 4
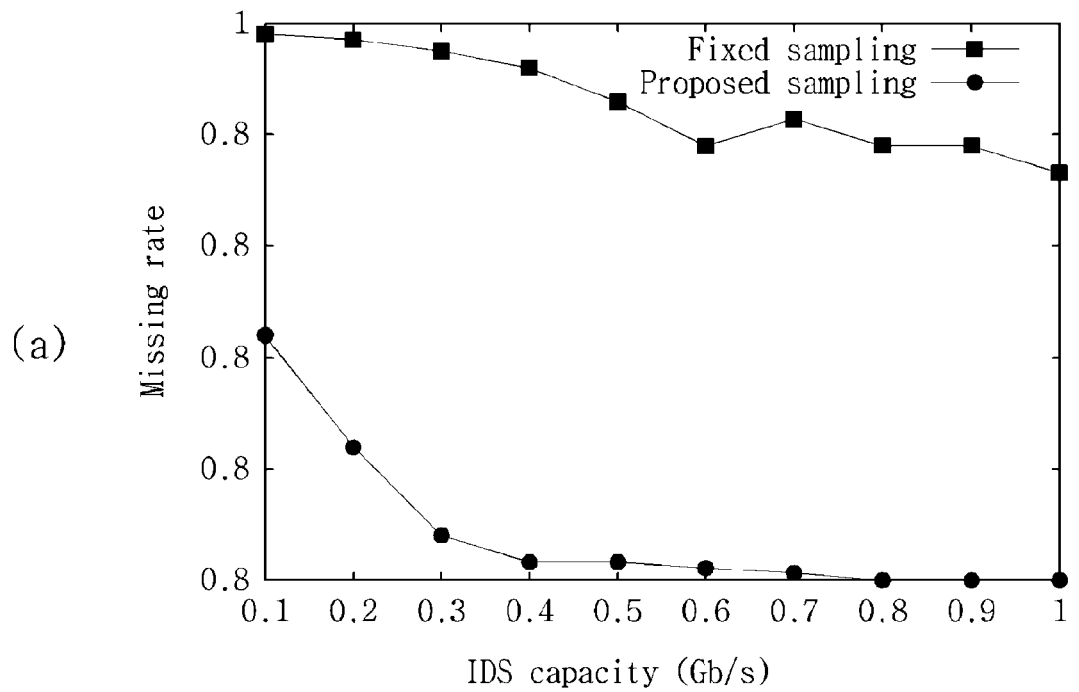
(a)
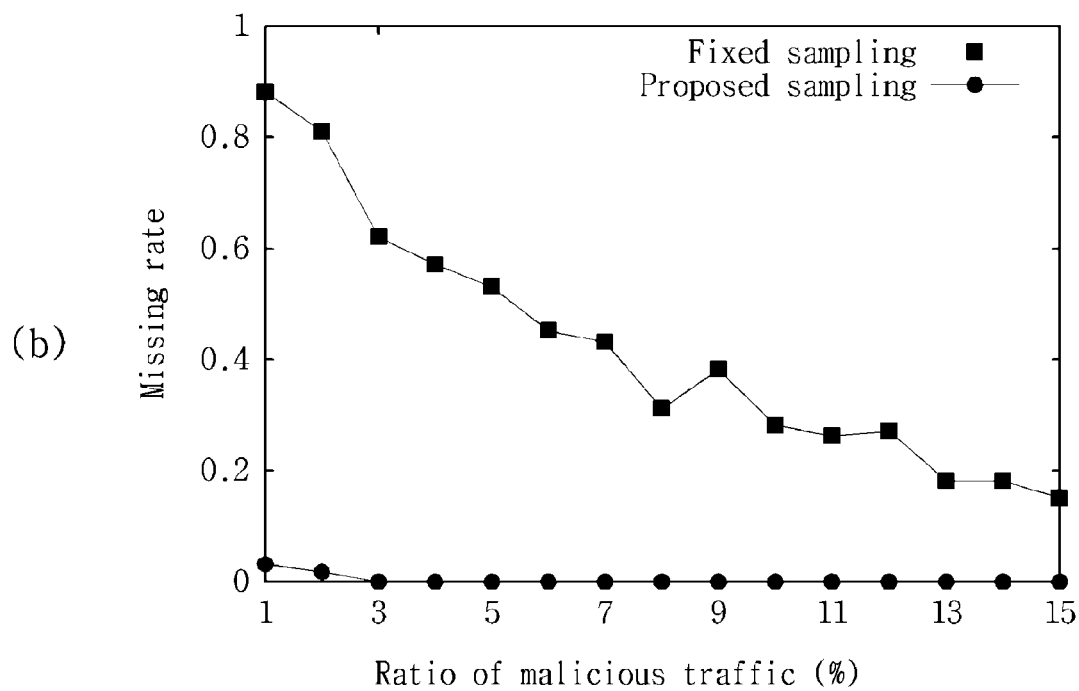
(b)

METHOD FOR DETECTING INTRUSION IN NETWORK

CROSS REFERENCE TO RELATED APPLICATION

This application claims the benefit of Korean Patent Application No. 10-2014-0183589, filed on Dec. 18, 2014, entitled "METHOD FOR DETECTING INTRUSION IN NETWORK", which is hereby incorporated by reference in its entirety into this application.

BACKGROUND

1. Technical Field

The present disclosure relates to a method for detecting an intrusion in a network. More specifically, the present disclosure relates to a method for detecting an intrusion in a network in which the entire network can be examined by adding SDN devices to an existing network, with different sampling rates for different switches.

2. Description of the Related Art

Software-based networks run on computers are rapidly growing as they provide Internet services such as data transmission, on-line banking, positioning systems, etc. In particular, cloud data systems are now becoming essential parts of many people's lives. As the scale of networks becomes huge, attacks on the networks are also increasing day by day, such as security threats to invade privacy and safety, and it becomes more difficult to detect intrusions.

To establish a secure and reliable network, it is an important issue to develop a system for detecting and blocking malicious traffics on the network. An intrusion detection system (IDS) observes flows on a network and examines data packets to see if any of them has a malicious intention. Previously, the IDS has been operated in two modes: a passive mode and an inline mode. In the passive mode, the IDS is dependent on a single node and is connected to a network, and receives a data packet from the node to examine it. On the other hand, in the inline mode, the IDS is disposed as a part of a node of a network and located in an arbitrary link to analyze data flows via the link.

However, it is almost impossible to predict a path via which a malicious traffic is going to pass and locate the IDS at the corresponding network traffic. Accordingly, the IDS is typically disposed at a node where many networks are engaged. Unfortunately, as the scale of networks become larger, it is very difficult to determine where to dispose the IDS. Further, many IDSes are required for performing a great amount of monitoring operations. To overcome these problems, a network traffic sampling method has been proposed.

According to the network traffic sampling method, network traffics are partially observed, and monitoring is performed on sampled traffics. During the sampling process, however, monitoring on a traffic bearing a malicious packet may be skipped. Therefore, what is required is an improved network traffic sampling method for effectively detecting a malicious traffic.

SUMMARY

It is one aspect of the present disclosure to provide a method for detecting an intrusion in a network environment, in which data packets are forwarded to an IDS at a particular position via switches disposed in a network with different sampling rates, so that the entire network can be examined.

It is another aspect of the present disclosure to provide a method for detecting an intrusion in a network, by which it is possible to prevent that a packet bearing a malicious attack is missed and is not forwarded from the switches to the IDS, and the attack detecting functionality can be enhanced by adding SDN-enabled devices to an existing network.

In accordance with one aspect of the present disclosure, a method for detecting an intrusion in a network is provided. The network includes a plurality of nodes for data transmission/reception and switches for relaying flow transmission/reception between the nodes, and an intrusion detection system (IDS) is combined with the network to form a system. The method includes: installing SDN-enabled switches for flow sampling in the network to connect them to a SDN controller; determining, by the SDN controller, the number of network flows and the number of switches; deriving a sampling rate for each of the SDN-enabled switches; forwarding, by the switches, packet information to the IDS according to the sampling rate; and identifying, by the IDS, malicious data based on the packet information to update the sampling rate of each of the SDN switches.

BRIEF DESCRIPTION OF THE DRAWINGS

The above and other aspects, features and advantages of the present invention will become apparent from the following description of exemplary embodiments given in conjunction with the accompanying drawings, in which:

FIG. 4 shows graphs comparing missing rates in the prior art with missing rates in a network according to the present disclosure.

DETAILED DESCRIPTION

Hereinafter, exemplary embodiments of the present disclosure will be described in detail with reference to the accompanying drawings. However, the present disclosure is not limited to these exemplary embodiments. In describing the present disclosure, a description of a well-known function or configuration may be omitted in order not to obscure the gist of the present disclosure.

According to an exemplary embodiment of the present disclosure, the software defined networking (SDN) structure is introduced in order to detect attacks on the entire network by performing traffic sampling by the IDS disposed at a particular location of the network. The SDN is a type of virtualization technology that represents network devices, i.e., hardware functionality in software.

Figure 1:
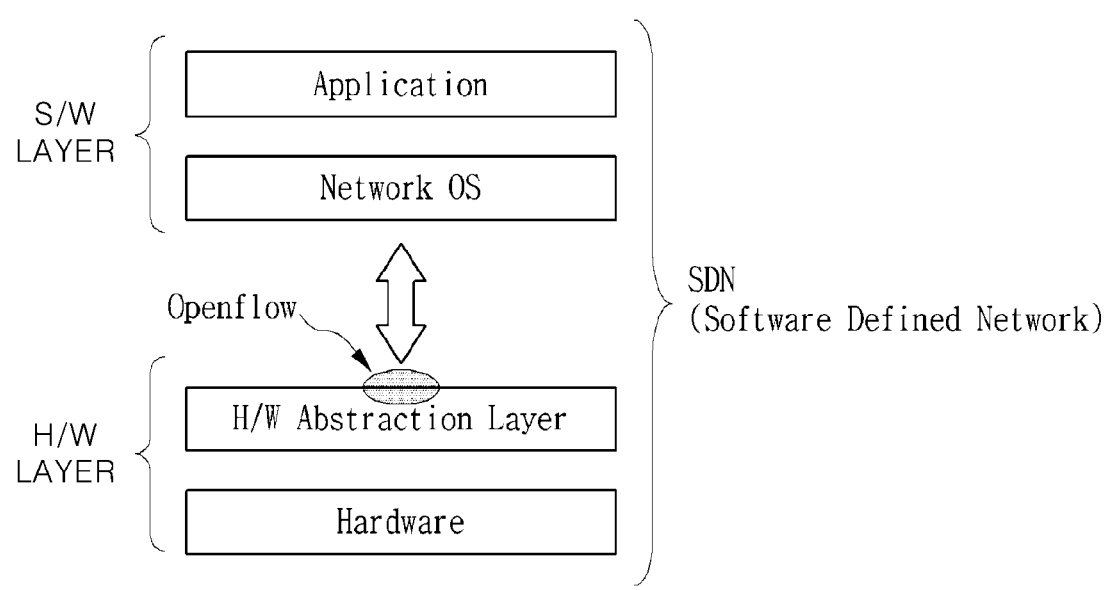
FIG. 1 shows a conceptual diagram for illustrating a SDN structure and Openflow.

FIG. 1 shows a block diagram of a SDN structure and Openflow. Referring to FIG. 1, a SDN includes a software layer consisting of an application and a network operating system, and a hardware layer consisting of a hardware abstraction layer and hardware. Openflow is located at the connection point with the hardware layer.

An Openflow-based SDN system includes a plurality of Openflow switches and an Openflow controller for controlling them. The Openflow controller provides flow control information (an output port, QoS, etc.) for handling received packets. The Openflow switches handle packets based on the flow control information provided from the Openflow controller.

Typically, each of the Openflow switches has an Openflow table for storing the flow control information. Upon receiving a packet corresponding to a flow stored in the Openflow table, an Openflow switch handles the packet according to the flow control information.

On the other hand, upon receiving a packet with no corresponding flow stored in the Openflow table, the Openflow switch forwards the packet to an Openflow controller since there is no flow control information. The Openflow controller analyzes packets to create flow control information and forward it to the Openflow switches along with the packets. The Openflow switches store the received flow control information in the Openflow table to handle the packets.

Figure 2:
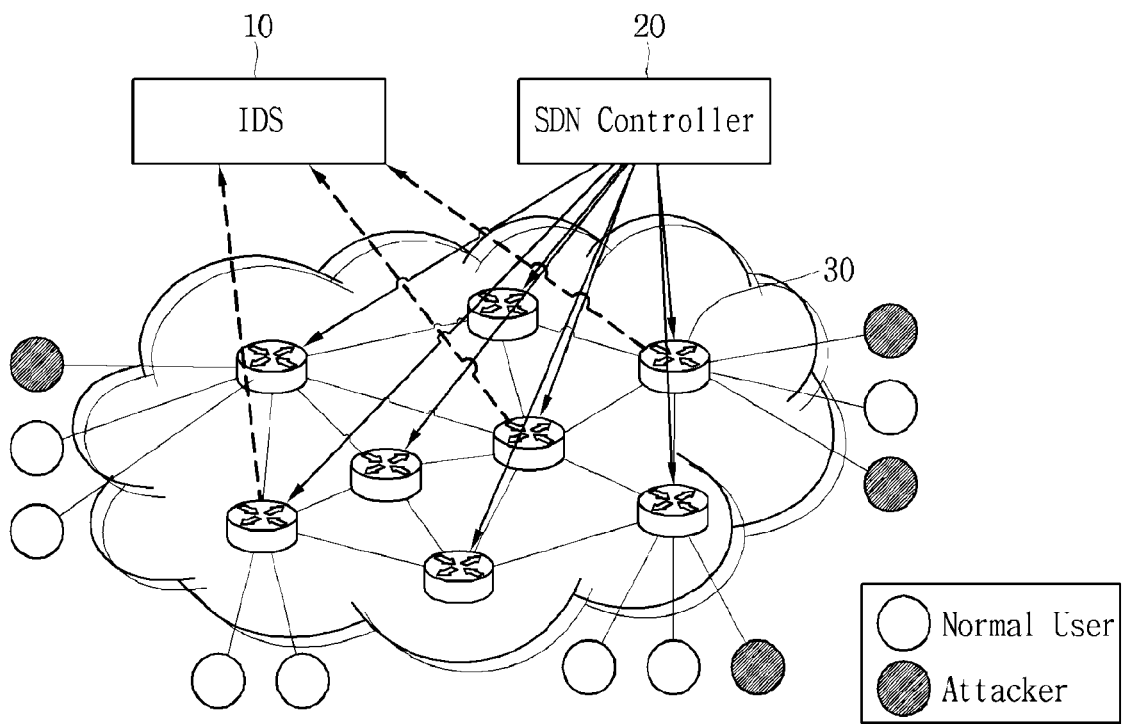
FIG. 2 shows a view showing an example of a system in which a IDS is disposed in a SDN-based network for carrying out traffic sampling according to an exemplary embodiment of the present disclosure.

FIG. 2 shows a view showing a system for carrying out traffic sampling on a network according to an exemplary embodiment of the present disclosure.

Referring to FIG. 2, the system according to the exemplary embodiment of the present disclosure is a SDN-based network system in which a SDN controller 20, Openflow (OF)-enabled switches 30 and an intrusion detection system (IDS) 10 are combined. Although the exemplary embodiment is carried out in the SDN-based system, it may also be carried out in an existing network by installing SDN devices in cooperation with existing switches and controller. In the following descriptions, the switches may be SDN-enabled switches in cooperation with the SDN.

The SDN controller 20 may include Openflow-enabled switches 30 in the control plane to detect a data flow in the switch 30. Further, the SDN controller 20 includes an algorithm for deciding a sampling rate. The Openflow refers to a networking protocol in which the SDN controller 20 communicates to access tables given to the switches 30.

Each of the Openflow-enabled switches 30 forwards a data packet according to a sampling rate decided by the SDN controller 20. In addition, the IDS 10 monitor all of data packets forwarded from the switches 30 and trigger an alarm if a suspicious packet or an attack is detected. This may be accessed by the SDN controller 20.

The SDN controller 20 derives an optimal sampling rate for each of the switches 30 based on data obtained from monitoring the current conditions of the IDS 10 and the switches 30. The algorithm for deciding the sampling rates of the switches 30 is to minimize missing rates of suspicious traffic detection while maintaining the overall amount of sampled flows below the maximum monitoring capacity of the IDS 10.

The system for detecting an intrusion in a network according to the exemplary embodiment of the present disclosure may be used in a SDN-based network or in an existing network with SDN-compatible switches (routers) installed therein. That is, unlike an existing scheme in which all of the switches are sampled at the same rate, according to the exemplary embodiment of the present disclosure, a sampling rate is derived for each of the switches 30 disposed in a network by the SDN controller. Accordingly, the overall traffic in the network can be examined regardless of where the IDS is disposed.

Figure 3:
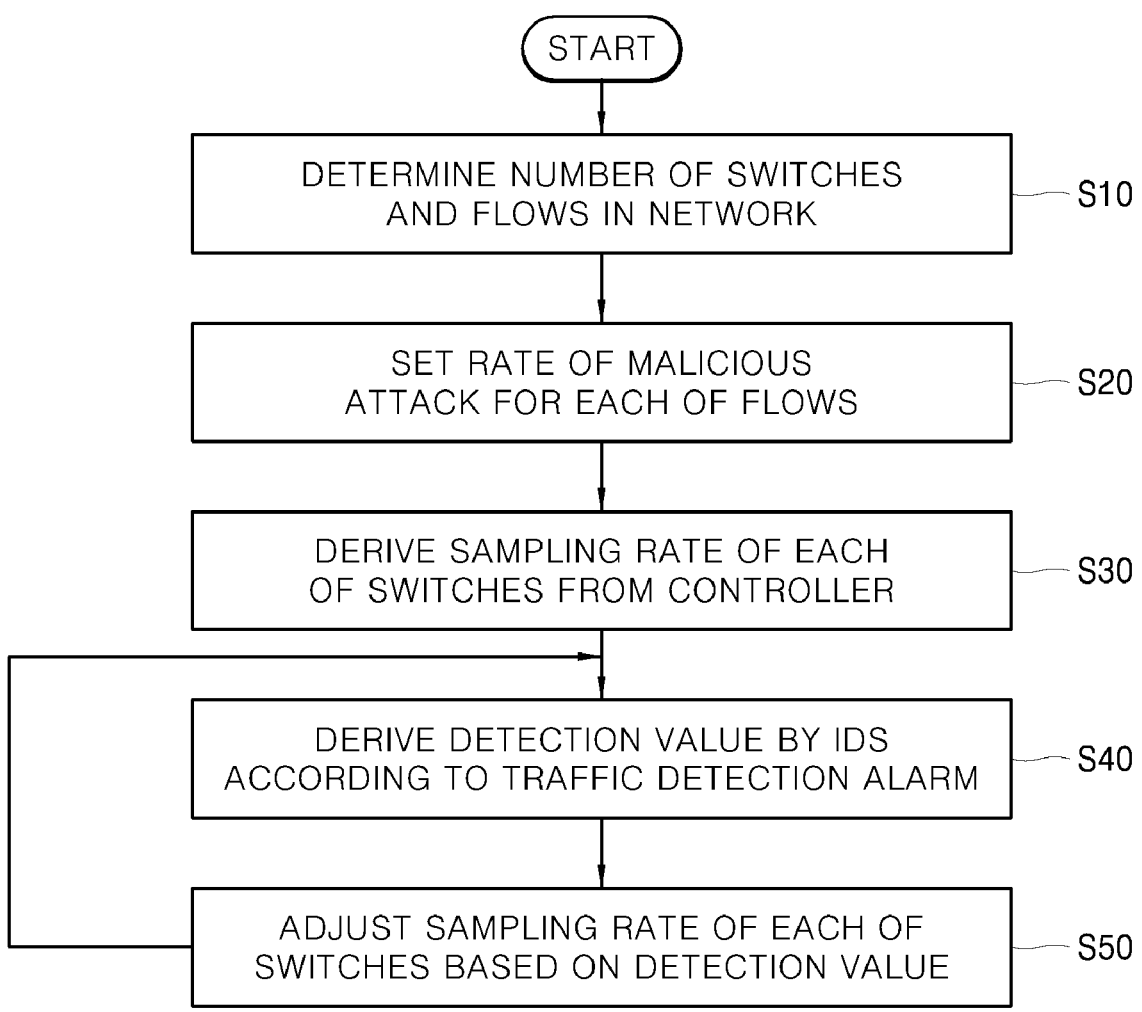
FIG. 3 shows a flowchart for illustrating a method for carrying out traffic sampling according to an exemplary embodiment of the present disclosure.

FIG. 3 shows a flowchart for illustrating a method for carrying out traffic sampling according to an exemplary embodiment of the present disclosure. A method for deciding a sampling rate according to an exemplary embodiment of the present disclosure will be described in detail with reference to FIG. 3.

The method may be carried out in a system where IDS is combined with a network consisting of a plurality of nodes for data transmission/reception and switches for relaying flow transmission/reception between the nodes. In this exemplary embodiment, installing SDN-enabled switches for flow sampling in the network and connecting them to the SDN controller may be performed in advance.

The method for carrying out the traffic sampling according to the exemplary embodiment initially performs determining the number of switches and the number of flows in the network (step S10). Specifically, let us assume that there are f flows and n switches in the network. That is, $i=\{1, \ldots f\}$ and $j=\{1, \ldots n\}$ are established, where i and j represent the number of the flows and the number of the switches, respectively. A rate at which malicious attacks take place is denoted by $\lambda$, and different flows have different rates. If a flow has no malicious packet, the rate of malicious attacks is zero. The transmission rate of a flow is defined by transmission rate vector $s=\{s_1, \ldots s_f\}$, and the rate of a malicious flow is defined by $\lambda=\{\lambda_1, \ldots \lambda_f\}$. The transmission rate of a flow and the rate of a malicious attack may be calculated in packets per second (pps).

As described above, the flow location of each of the switches may be determined by SDN controller. From the information, a matrix A can be derived that is flow path information like a routing table in an existing network. The flow path information matrix A is an f-by-n matrix. An element $a_{i,j}$ has the value of one only when the $i^{th}$ flow passes through the $j^{th}$ switch, and has the value of zero otherwise. The transmission rate of the switch is expressed as $b=s \cdot A$ from the transmission rate s of the flow and the path information matrix A of each of the flows. The symbol $b_j$ denotes the transmission rate of the $j^{th}$ switch.

The sampling of packets may be carried out in the switches according to the sampling rate of each of the switches. The sampling rate vector is denoted by x, and $x_j$ represents the sampling rate of the $j^{th}$ switch.

$$x=\{x_1, \ldots x_n\}, 0 \leq x_j \leq 1$$

If $x_j$ has the value of 1, all of the packets that pass through the $j^{th}$ switch are subject to sampling and forwarded to the IDS. Subsequently, the rate at which malicious attacks take place is set for all of the flows (step S20).

In the related art, the term "false negative rate" is commonly used to denote risk detection. The false negative is an error in which the IDS fails to detect a suspicious attack when it has actually taken place. In short, the false negative rate may refer to a missing rate, meaning that the IDS is not aware of an attack. If no suspicious packet is sampled during the process of examining data packets, it may be regarded that the IDS has missed the presence of an attack. That is, the performance of the IDS may be represented by the missing rate.

It may be considered that every flow has the probability that an attack takes place and potentially includes a malicious flow. A single flow passes through several switches on its way to a destination. If the IDS detects no malicious packet, none of the flows sampled in any of the switches has to bear a malicious packet. Accordingly, a vector that represents a rate of malicious attacks for ever flow is set as $\lambda$. The relationship $\lambda=\{\lambda_1, \lambda_2, \ldots \lambda_f\}$ is established, where the ith vector is denoted by $\lambda_i=\eta$. The initial value of $\lambda$ may be equal for every flow.

Subsequently, a sampling rate of each of the switches is calculated from the controller (step S30). A function M(x) that minimizes the maximum value of missing rates of malicious attacks is and an initial sampling rate vector x can be derived using the above-described rate of malicious attacks.

The performance of the attack detecting system depends on how many malicious data items the IDS can detect. Assuming that all of malicious packets forwarded to the IDS are detected, the sampling rate may be set so that it minimizes the missing rates of traffics including malicious attacks, enhancing the performance of the attack detecting system. Accordingly, flow tables may be given to the switches from the SDN controller, to set the sampling rate for each of the switches.

In steps S10 to S30, the method of setting the sampling rate of each of the switches from the SDN controller has been described. However, since the initial value of λ which is a vector indicating the rate of malicious attacks for flows is set to be equal for all of the flows, it is necessary to optimize the value depending on the rate at which malicious attacks take place.

Accordingly, in step S40, an alarm is triggered if the IDS detects a malicious traffic, and derives a detection value by the detection alarm. In this step, the rate at which malicious attacks take place for each of traffics including malicious attacks are calculated. Data packets forwarded to the IDS is calculated for each of the flows. The amount of malicious packets detected in a flow is compared with the calculated data packets to calculate a rate at which malicious attacks take place, updating a detection value. However, the detection value may not be reliable since it may be the initial value when a malicious attack takes place at a particular position. Accordingly, an average value of k-times repetition is derived, to optimize the rate at which a malicious attack takes place.

Subsequently, a sampling rate of each of the switches is adjusted based on the average of the detect values (step S50). Once the rate at which malicious attacks take place is reset by the average value, the function M(x) that minimizes the maximum value of the missing rate of malicious attacks are recalculated. The value of x which is a sampling rate vector corresponding to it may be recalculated, and the sampling rate may be newly set. By repeating the resetting of the rate at which malicious attacks take place in this manner, the vector indicating the rate at which malicious attacks take place can be set more closely to the actual value.

That is, as described above, according to the exemplary embodiment of the present disclosure, on a SDN-based network, traffics can be sampled at every position using the SDN controller and forwarded to the IDS. As a result, the IDS can examine all of the packets flowing in the SDN-based network. Accordingly, according to the exemplary embodiment of the present disclosure, different sampling rates are set for different switches, and malicious attacks can be detected more effectively.

FIG. 4 shows graphs showing missing rates of malicious attacks in an existing network and in the network according to the present disclosure. Graph (a) in FIG. 4 shows missing rates according to IDS capacity, and Graph (b) in FIG. 4 shows missing rates according to malicious traffic rates.

Referring to graph (a) in FIG. 4, a line indicates a result when the sampling rate is fixed for all of two-hundred switches of a network, and the other line indicates a result when the sampling rates are different for different switches according to the exemplary embodiment of the present disclosure. It can be seen that the missing rate approximates 1 and is above 0.7 when the sampling rate is constant (fixed sampling) for all of the switches. This means that even when an attack takes place in a network, the packet under the malicious attack is missed from the sampled data packets in switches, so that the IDS practically fails to detect the attack.

In contrast, it can be seen that when the sampling rates are different for different switches (proposed sampling) according to the exemplary embodiment of the present disclosure, a traffic under a malicious attack is more likely to be transferred to the IDS, and thus the missing rates of the malicious attacks gradually converge to zero.

Referring to graph (b) in FIG. 4, it can be seen that missing rates gradually decrease as the malicious traffic rates increase when the sampling rate is constant for all of the switches (fixed sampling) as in the related art. In contrast, it can be seen that missing rates are close to zero from the beginning when the sampling rates are different for different switches as in the exemplary embodiment of the present disclosure.

Therefore, it can be said that the method according to the exemplary embodiment of the present disclosure can minimize missing rates of malicious attacks and detect as many attacks as possible, and thus has better performance of detecting attacks over the existing systems.

As described above, according to the exemplary embodiment of the present disclosure, by making sampling rates different for different switches, malicious packets are more likely to be transferred to the IDS, and thus the performance of detecting malicious attacks can be improved over existing systems. This improvement can be easily achieved by installing SDN devices such as SDN-enabled switches and controller in an existing network to connect them.

Accordingly, according to the exemplary embodiment of the present disclosure, it is possible to detect whether there is attack data for the entire network traffics by an IDS disposed at an arbitrary location without increasing the number of IDSes in proportion to the size of the network, so that the network can be monitored more efficiently. In addition, a network can be set to perform examination focusing on suspicious traffics based on the examination results carried out by the IDS.

According to the exemplary embodiment of the present disclosure, even though IDS devices are added to a network, it is possible to carry out examination without modifying an algorithm for sampling. Further, by adding SDN devices in an existing network, it is possible to monitor the entire network and detect attacks via sampling, so that the network becomes reliable even without expanding the size of the system. In addition, the system design cost is can be greatly reduced.

According to exemplary embodiments of the present disclosure, by adding SDN-enabled switches and a controller to an existing network to connect them, an attack on the entire network can be detected and monitored, so that network security can be further enhanced.

According to exemplary embodiment of the present disclosure, it is possible to examine whether there is attack data for the entire network traffic by an IDS disposed at a particular position, so that network security can be further enhanced.

According to the exemplary embodiment of the present disclosure, a network can be set to perform examination focusing on suspicious traffics based on the examination results carried out by the IDS.

According to the exemplary embodiment of the present disclosure, even though IDS devices are added to a network, it is possible to carry out examination without modifying an algorithm for sampling. Further, by adding SDN devices in an existing network, it is possible to monitor the entire network and detect attacks via sampling, so that the network becomes reliable even without expanding the size of the system. In addition, the system design cost can be greatly reduced.

Although the exemplary embodiment of the present disclosure have been disclosed for illustrative purposes, those skilled in the art would appreciate that various modifications and substitutions may be made without departing from the scope and spirit of the disclosure. For example, specific elements of the exemplary embodiments may be modified. Such modifications and substitutions are also construed as falling within the scope of the present disclosure as defined by the appended claims.

What is claimed is:

1. A method for detecting an intrusion in a network, the method performed by a system, said system comprising the network having a plurality of nodes for data transmission/reception and switches for relaying flow transmission/reception between the nodes, an intrusion detection system (IDS) combined with the network and a Software Defined Networking (SDN) controller, the method comprising:
   installing, by the SDN controller, SDN-enabled switches for flow sampling in the network to connect the network to the SDN controller;
   determining, by the SDN controller, information on the number of network flows and the number of the switches in the network;
   calculating, by the SDN controller, a function $M(x)$, minimizing a maximum value of missing rates of malicious attacks in the IDS, based on an initial value of a rate at which a malicious attack takes place for each of the network flows, where x represents a sampling rate vector of the each of the SDN-enabled switches;
   calculating, by the SDN controller, a sampling rate for each of the SDN-enabled switches using a flow table which is created by the SDN controller based on the calculated function $M(x)$;
   forwarding, by the SDN-enabled switches, packet information to the IDS according to the calculated sampling rate; identifying, by the IDS, malicious data based on the packet information; and
   updating, by the SDN controller, the sampling rate of the each of the SDN-enabled switches based on the identified malicious data.

2. The method of claim 1, further comprising: calculating, by the SDN controller, a missing rate of the network flows with a constant IDS capacity.

3. The method of claim 1, wherein the each of the SDN-enabled switches forwards, to the IDS, data packets based on the flow table.

4. The method of claim 1, wherein the identifying of malicious data comprises when the IDS detects a malicious traffic, triggering a detection alarm to calculate a rate at which a malicious attack takes place for the malicious traffic.

5. The method of claim 4, further comprising: estimating an estimated rate at which a malicious attack takes place for each of the network flows using the calculated rate.

6. The method of claim 5, wherein the estimated rate is repeatedly estimated by the IDS a predetermined number times to calculate an average value of the repeated estimations, and
   the sampling rate for each of the SDN-enabled switches is calculated based on the calculated average value.

* * * * *